(12) United States Patent
Yang

(10) Patent No.: US 8,254,994 B2
(45) Date of Patent: Aug. 28, 2012

(54) WIRELESS COMMUNICATION RECEIVER

(75) Inventor: Hsin-Yung Yang, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 307 days.

(21) Appl. No.: 12/753,120

(22) Filed: Apr. 2, 2010

(65) Prior Publication Data

US 2011/0151823 A1    Jun. 23, 2011

(30) Foreign Application Priority Data

Dec. 22, 2009   (TW) ................. 98144340 A

(51) Int. Cl.
*H04B 1/38* (2006.01)
*H04B 1/08* (2006.01)
*H04M 1/00* (2006.01)

(52) U.S. Cl. ............ 455/557; 455/556.1; 455/558; 455/562.1; 455/347

(58) Field of Classification Search .......... 455/557, 455/556.1, 558, 562.1, 550.1, 575.1, 575.4, 455/575.5, 585.3, 575.7, 575.8, 90.3, 128, 455/129, 344–349; 361/737, 679.21, 679.32, 361/727, 752, 754; 348/725; 365/52; 343/702; 235/441; 439/79, 135, 136, 159, 131, 142, 439/138

See application file for complete search history.

(56) References Cited

U.S. PATENT DOCUMENTS

| 6,758,689 | B1 * | 7/2004 | Bair et al. ................ 439/136 |
| 6,975,274 | B2 * | 12/2005 | Sanchez et al. ............ 343/702 |
| D537,820 | S * | 3/2007 | Hsu .................. D14/480.1 |
| D542,787 | S * | 5/2007 | Siu .................. D14/480.5 |
| D552,610 | S * | 10/2007 | Newby et al. ............. D14/433 |
| D556,196 | S * | 11/2007 | Cheng ................. D14/480.3 |
| 7,295,431 | B2 * | 11/2007 | Chuang ................. 361/679.55 |
| 7,416,424 | B1 * | 8/2008 | Deckman ................. 439/135 |
| D580,434 | S * | 11/2008 | Kim ................... D14/480.6 |
| 7,473,112 | B2 * | 1/2009 | Zhu et al. ................ 439/142 |
| 7,494,343 | B2 * | 2/2009 | Schriefer ................ 439/11 |
| 7,500,858 | B2 * | 3/2009 | Emerson et al. ........... 439/136 |
| 7,530,823 | B1 * | 5/2009 | Thornton et al. ........... 439/136 |
| 7,551,450 | B2 * | 6/2009 | Sugawara et al. .......... 361/752 |
| 7,586,460 | B2 * | 9/2009 | Hunt et al. .............. 343/882 |
| 7,737,895 | B2 * | 6/2010 | Sanchez et al. ............ 343/702 |
| 8,085,544 | B2 * | 12/2011 | Zhao .................. 361/737 |
| 2005/0130469 | A1 * | 6/2005 | Ikenoue ................. 439/131 |
| 2008/0192149 | A1 * | 8/2008 | Lee .................... 348/725 |
| 2011/0230147 | A1 * | 9/2011 | Schuh et al. .............. 455/90.2 |

* cited by examiner

*Primary Examiner* — Pablo Tran
(74) *Attorney, Agent, or Firm* — Altis Law Group, Inc.

(57) ABSTRACT

A wireless communication receiver includes a main body, a cover detachably assembled to the main body, and an antenna. The cover is slideably connected to the main body by the antenna.

13 Claims, 4 Drawing Sheets

WIRELESS COMMUNICATION RECEIVER

BACKGROUND

1. Technical Field

The disclosure generally relates to electronic wireless communication receivers, particularly to an electronic wireless communication receiver used with computers.

2. Description of Related Art

With development of wireless communication technology, wireless communication receivers are widely used for electronic devices such as computers. Commonly, a wireless communication receiver includes a main body and a cover. The cover is detachably assembled to the main body. When the wireless communication receiver is used to receive wireless communication signals for a computer, the cover is detached from the main body, and then the main body is connected to the computer. However, the cover separated from the main body may be easily lost.

Therefore, there is room for improvement within the art.

BRIEF DESCRIPTION OF THE DRAWINGS

Many aspects of the wireless communication receiver can be better understood with reference to the following drawings. The components in the drawings are not necessarily drawn to scale, the emphasis instead being placed upon clearly illustrating the principles of the wireless communication receiver.

DETAILED DESCRIPTION

Figure 1:
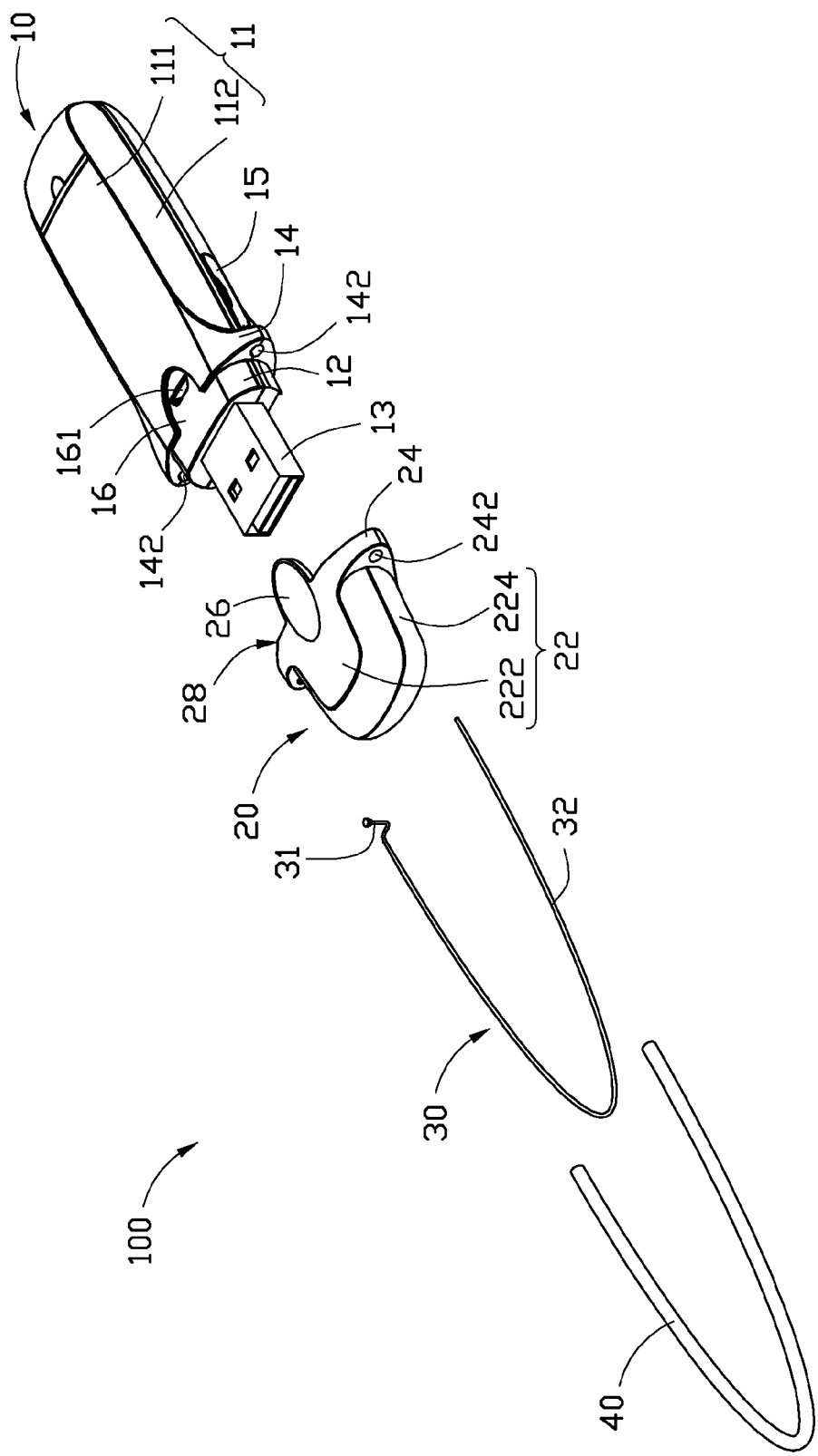
FIG. 1 is a disassembled perspective view of a wireless communication receiver including a cover and a main body, according to one exemplary embodiment.

Referring to FIG. 1, a wireless communication receiver 100, according to one exemplary embodiment, includes a main body 10, a cover 20, an antenna 30, and a sleeve 40. The cover 20 is slideably connected to the main body 10 between open and closed positions by the antenna 30. The sleeve 40 is placed around the antenna 30.

The main body 10 includes a housing 11, a latching portion 12, a Universal Serial Bus (USB) connector 13, two opposing protrusions 14, and a receiving portion 15. The housing 11 includes two opposing first flat surfaces 111 and two opposing first side surfaces 112 connecting the two first flat surfaces 111. Electrical elements (not shown) received in housing 11 support operation of the wireless communication receiver 100. A recess 16 is defined in each first surface 111 with a positioning hole 161 therein. The latching portion 12 extends from one end of the housing portion 11 to engage with the cover 20. The USB connector 13 protrudes from the latching portion 12 to connect to other electronic device such as a computer. The two protrusions 14 protrude from the two side surfaces 112 respectively and are adjacent to the latching portion 12. A mounting hole 142 is defined in each protrusion 14. The receiving portion 15 is substantially a hollow cylinder located at one side surface 112, and communicates with a corresponding mounting hole 142 to partially receive the antenna 30.

The cover 20 includes a cap 22, two protrusions 24, and two supporting portions 26. The cap 22, which includes two second flat surfaces 222 and two second side surfaces 224 connecting the two second flat surfaces 222 to each other, corresponds to the housing 11. A receiving cavity 28 with an opening is defined in one end of the cap 22 to receive the USB connector 13 and engage with the latching portion 12. The two protrusions 24 respectively protrude from the two side surfaces 224 of the cap 22 and are adjacent to one end of the cap 22, and correspond to the two protrusions 14 of the main body 10. A mounting hole 242 is defined in each protrusion 24. The two supporting portions 26 extend from an edge of each second flat surface 222 of the cover 20, corresponding to the recess 16 and the positioning holes 161.

The antenna 30 includes a connecting end 31 and a radiating portion 32 extending from the connecting end 31. The connecting end 31 extends through one of the mounting holes 242, and is received in its corresponding mounting hole 142 to electrically connect to the electrical elements in the housing portion 11. The radiating portion 32 extends through the mounting holes 242 of the cover 20 and the opposing mounting holes 142, and connects the cover 20 to the main body 10. A distal end of the radiating portion 32 is received in the receiving portion 15 of the main body 10. The radiating portion 32 may be made of flexible material.

The sleeve 40 is a hollow pipe made of flexible material. The sleeve 40 surrounds at least a part of the antenna 30 to protect the antenna 30.

Figure 2:
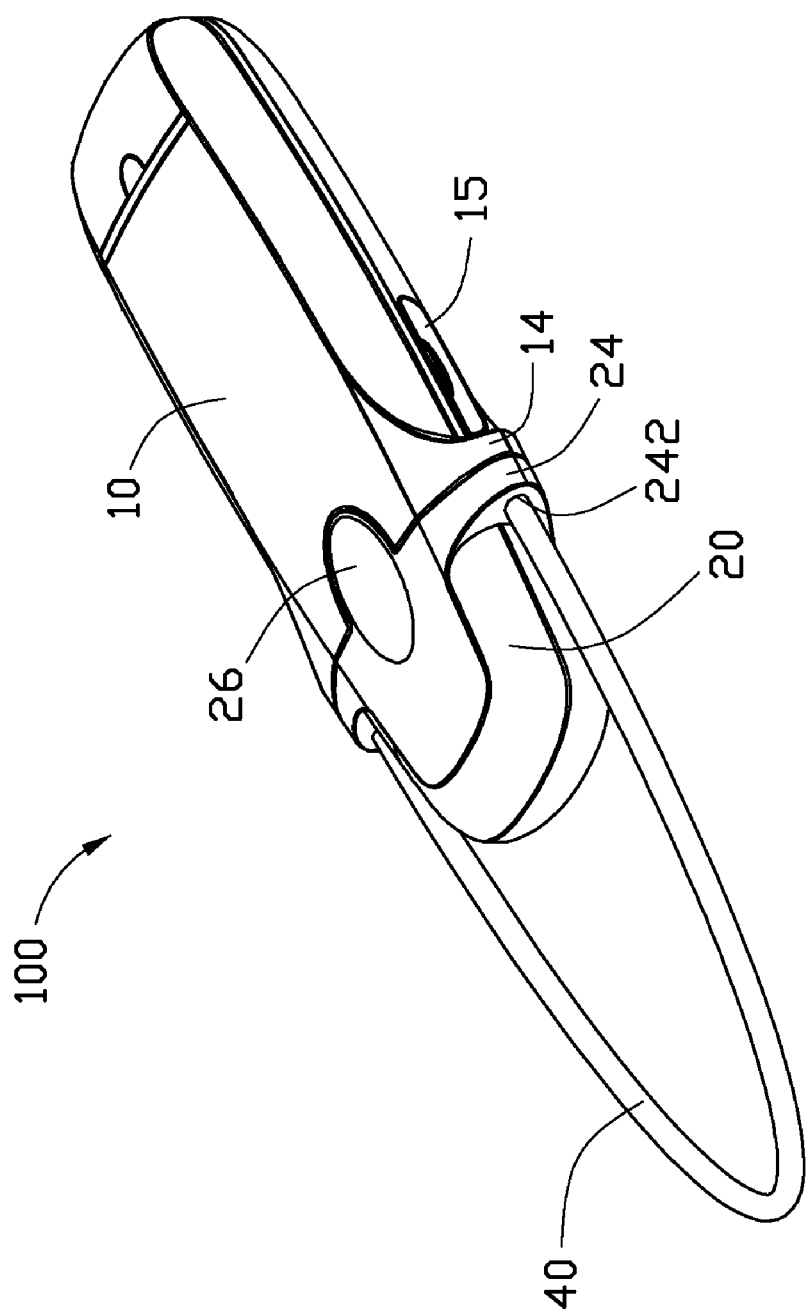
FIG. 2 is a schematic view of the wireless communication receiver of FIG. 1, when the cover is assembled to the main body.
Figure 3:
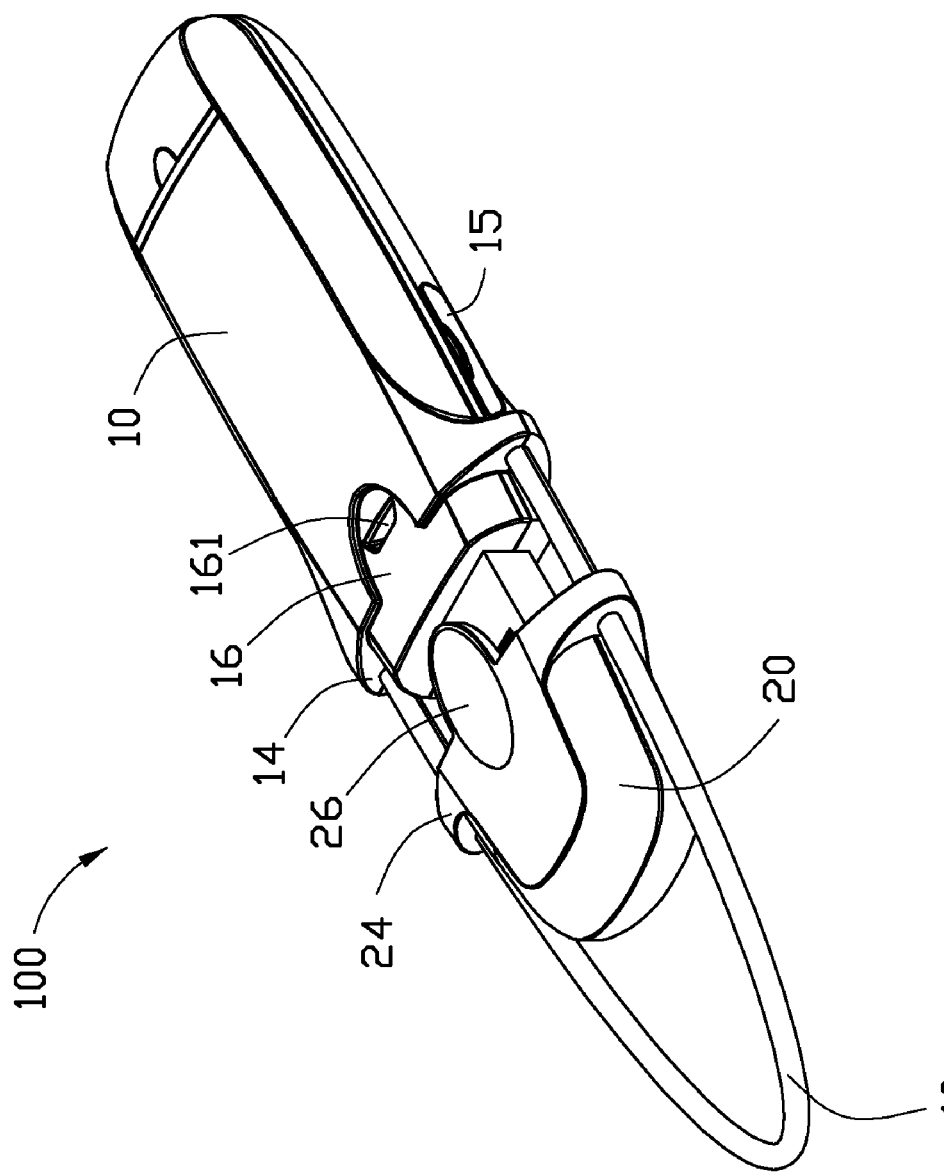
FIG. 3 is a schematic view of the wireless communication receiver of FIG. 1, when the cover is detached from the main body.

Referring to FIGS. 2 and 3, in assembly, firstly, the connecting end 31 of the antenna 30 is received in one of the mounting holes 142. Then, the radiating portion 32 is extended through one of the mounting holes 242 of the cover 20, and extended through the opposing mounting holes 142 with the sleeve 40 placed around the radiating portion 32. After that, the radiating portion 32 extends through the opposing mounting hole 242 and a distal end of the radiating portion 32 is partially received in the receiving portion 15 of the main body 10. Finally, the cover 20 is slid toward the main body 10 and the closed position until the USB connector 13 is received in the receiving cavity 28 and the latching portion 12 is engaged in the receiving cavity 28.

In other embodiments, two ends of the sleeve 40 can be extended through the mounting holes 242 and fixed in the mounting holes 142. Therefore, the cover 20 is slideably connected to main body 10 via the sleeve 40 and the antenna 30 together. In addition, the positions of the positioning hole 161 and the supporting portion 26 located in the main body 10 and length of the radiating portion 32 can be changed to improve performances of the antenna 30.

Figure 4:
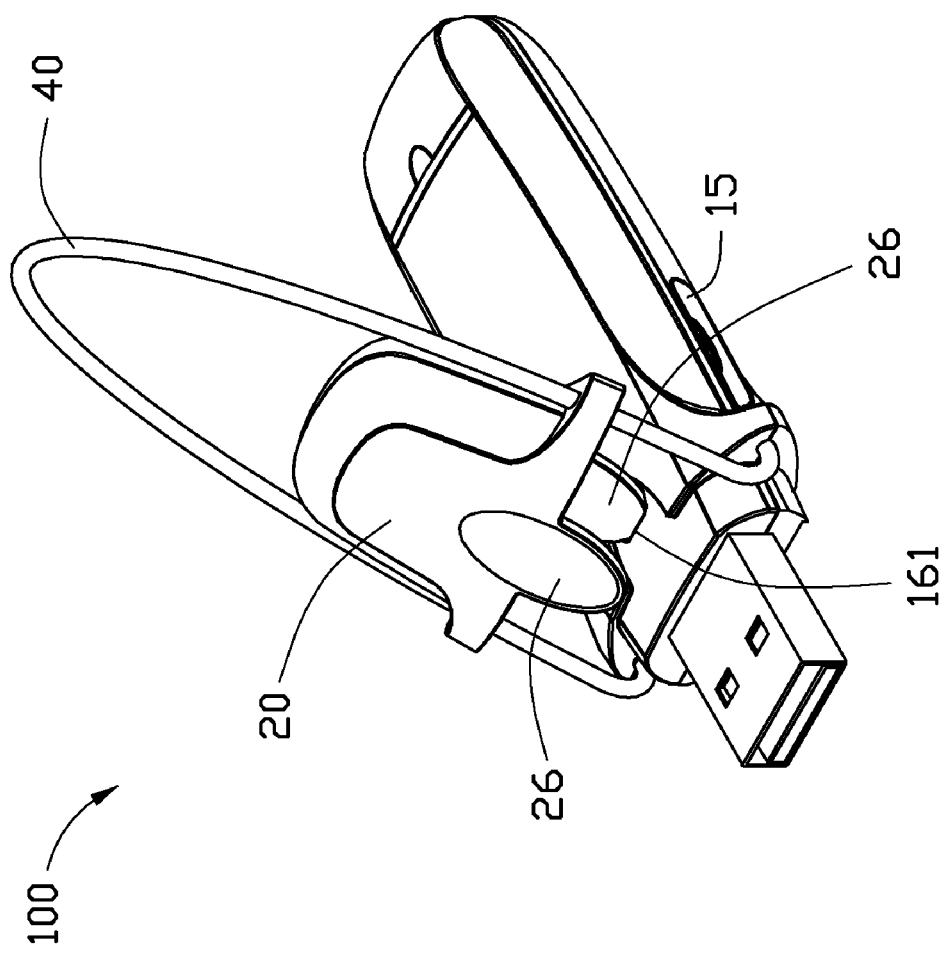
FIG. 4 is a schematic view of the wireless communication receiver of FIG. 1 shown in a use state.

Referring to FIG. 4, to use the wireless communication receiver 100 with a computer (not shown), the cover 20 is detached from the main body 10, and then slid away from the main body 10 along the sleeve 40 and antenna 30 towards the open position. The sleeve 40 and antenna 30 are resiliently bent relative to the main body 10 together with the cover 20. One supporting portion 26 is inserted in the positioning hole 161 to maintain the cover 20 in the open position to expose the USB surface 13 from the cover 20 so that it can be received in a USB connector.

It is believed that the exemplary embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A wireless communication receiver, comprising:
    a main body defining at least one positioning hole;
    a cover detachably assembled to the main body, the cover comprising at least one supporting portion corresponding to the positioning hole; and
    an antenna; wherein the cover is slideably connected to the main body by the antenna between open and closed positions, the supporting portion is inserted into the positioning hole to maintain the cover in an open position with the antenna resiliently bent relative to the main body.

2. The wireless communication receiver as claimed in claim 1, wherein the antenna comprises a connecting end and a radiating portion extending from the connecting end, the connecting end is received in the main body, and the radiating portion extends through the cover with a distal end received in the main body.

3. The wireless communication receiver as claimed in claim 1, wherein the antenna is made of flexible material.

4. The wireless communication receiver as claimed in claim 2, wherein, when the cover is in the open position, the radiating portion of the antenna is resiliently bent relative to the main body.

5. The wireless communication receiver as claimed in claim 1, further including a sleeve placed at least partially around the antenna.

6. The wireless communication receiver as claimed in claim 5, wherein the sleeve is made of flexible material.

7. The wireless communication receiver as claimed in claim 6, wherein two ends of the sleeve extending through the cover are fixed in the main body.

8. The wireless communication receiver as claimed in claim 7, wherein the main body and the cover both comprise two opposing protrusions, each protrusion defines a mounting hole, the two ends of the sleeve extend through the mounting holes of the cover, fixed in the mounting holes of the main body.

9. The wireless communication receiver as claimed in claim 7, wherein the main body includes a latching portion and a USB connector, the cover defines a receiving cavity to receive the USB connector and engage with the latching portion.

10. The wireless communication receiver as claimed in claim 8, wherein the main body further includes a receiving portion communicating with a corresponding mounting hole to receive the distal end of the antenna.

11. A wireless communication receiver, comprising:
    a main body;
    a cover detachably assembled to the main body, the cover defining two mounting holes; and
    an antenna, the antenna comprising:
        a connecting end received in the main body; and
        a radiating portion extending from the connecting end, the radiating portion extending through the mounting holes of the cover with a distal end received in the main body; wherein the cover is slidably connected to the main body by the antenna between an open position and a closed position.

12. The wireless communication receiver as claimed in claim 11, further comprising a sleeve placed at least partially around the antenna, wherein two ends of the sleeve extends through the mounting holes and fixed in the main body.

13. The wireless communication receiver as claimed in claim 11, wherein the main body defines at least one positioning hole, the cover comprises at least one supporting portion corresponding to the positioning hole, the supporting portion is inserted into the positioning hole to maintain the cover in an open position with the antenna resiliently bent relative to the main body.

\* \* \* \* \*